(12) United States Patent
Smith

(10) Patent No.: US 8,529,856 B2
(45) Date of Patent: Sep. 10, 2013

(54) METHOD AND APPARATUS TO SEQUESTER $CO_2$ GAS

(76) Inventor: David R. Smith, Kilgore, TX (US)

( * ) Notice: Subject to any disclaimer, the term of this patent is extended or adjusted under 35 U.S.C. 154(b) by 262 days.

(21) Appl. No.: 12/853,433

(22) Filed: Aug. 10, 2010

(65) Prior Publication Data

US 2011/0033355 A1     Feb. 10, 2011

Related U.S. Application Data

(60) Provisional application No. 61/232,636, filed on Aug. 10, 2009.

(51) Int. Cl.
*B01D 53/62* (2006.01)
*B01D 53/96* (2006.01)

(52) U.S. Cl.
USPC ............ 423/224; 423/230; 423/246; 423/247

(58) Field of Classification Search
USPC ................. 423/210, 220, 224, 230, 231, 246, 423/247
See application file for complete search history.

(56) References Cited

U.S. PATENT DOCUMENTS

| | | |
|---|---|---|
| 2007/0217981 A1 | 9/2007 | Van Essendelft |
| 2008/0267838 A1 | 10/2008 | Reddy et al. |
| 2009/0013593 A1 * | 1/2009 | Young ............................ 44/628 |

FOREIGN PATENT DOCUMENTS

| | | | |
|---|---|---|---|
| JP | 06-114238 | * | 4/1994 |
| WO | WO 2007/139392 | * | 12/2007 |

OTHER PUBLICATIONS

Hussey et al., "The Reaction of Zirconium with Carbon Dioxide and Carbon Monoxide at 850C." J. Electrochem. Soc. vol. 112, Issue 6, pp. 554-560 (1965).*
International Preliminary Report on Patentability of PCT/US2010/044978, dated Feb. 23, 2012, 5 pages.
International Search Report and Written Opinion dated Apr. 26, 2011.

* cited by examiner

*Primary Examiner* — Stanley Silverman
*Assistant Examiner* — Daniel Berns
(74) *Attorney, Agent, or Firm* — Fulbright & Jaworski LLP

(57) ABSTRACT

The present invention is directed to methods to sequester oxides of carbon to prevent them from entering the atmosphere as gases. More specifically, this invention is directed to methods of chemical reactions and process to decompose carbon oxides by combustion of a metal fuel with carbon oxides using a regeneration process to recover the metal fuel. The process can optionally and beneficially be coupled to other useful chemical processes for the industrial purpose of sequestering carbon oxides into useful commercial chemicals and elements like carbon, chlorine, and sodium bicarbonate.

12 Claims, 3 Drawing Sheets

METHOD AND APPARATUS TO SEQUESTER $CO_2$ GAS

CROSS-REFERENCE TO RELATED APPLICATIONS

This application claims priority to U.S. provisional patent application 61/232,636, filed Aug. 10, 2009.

TECHNICAL FIELD

The present invention is directed to methods and apparatus to sequester oxides of carbon, especially gaseous carbon dioxide and carbon monoxide. More specifically, this invention is directed to methods of chemical reactions and process to convert oxides of carbon into liquids and solids thereby sequestering carbon by preventing its oxides from entering the atmosphere by combusting them with metal fuels.

BACKGROUND OF THE INVENTION

Oftentimes hydrocarbon gases and helium are found in subterranean reservoirs with large quantities of carbon dioxide. The hydrocarbon fluids and carbon dioxide are produced simultaneously from the subterranean reservoirs to the surface of the earth. The carbon dioxide is vented to the atmosphere and the hydrocarbons and or helium are commercialized. Examples of such reservoirs are offshore Indonesia and Western Wyoming. When many combustion and industrial processes occur within the earth's atmosphere a hydrocarbon fuel combines with oxygen from the atmosphere to form combustion gases. A typical combustion process using the earth's atmosphere produces exhaust gases one of which is carbon dioxide. An example of industrial process that produce carbon oxides are the process of forming ammonia from methane using the classical water gas shift, and the generation of hydrogen from methane in the same water shift method. There is a large body of science that has shown that carbon dioxide is detrimental to the earth's climate, and that capture and sequestering of $CO_2$ gases from the earth's atmosphere is a useful pursuit. What is needed is an industrial means to allow hydrogen, hydrocarbons, and ammonia to be processed at industrial and well sites where the carbon oxides are converted into non-gaseous forms.

Furthermore, many $CO_2$ gas sequestering methods have been proposed which attempt to re-inject and contain gases of oxides of carbon in subterranean environments. It is clear from thermodynamics that the work required to move, and or compress molecules of carbon dioxide as a gas is significantly greater than moving $CO_2$ molecules when they are in liquid or solid form. It is an objective of this invention to convert carbon gases into liquids and solids to reduce the cost of storage and sequestering these gases from the earths atmosphere.

Moreover, the storage or so called sequestering of $CO_2$ as a gas requires vast reservoirs of subterranean earth to be used as a sequestering domain for $CO_2$ gases. These vast reservoirs must be drilled in the earth to open up subterranean environments or reservoirs as those familiar to the mining and oil and gas well construction industry are aware such domains may eventually leak or pollute fresh water reservoirs or eventually leak once again into the atmosphere.

What is needed are methods and apparatus to sequester carbon gases gas into solids and liquids in a massive continual process on the surface of the earth. The present invention also includes a process and apparatus to convert gaseous carbon gases to carbon for easy sequestration and to prevent gaseous carbon from being released into the atmosphere, thereby avoiding environmental problems.

BRIEF SUMMARY OF THE INVENTION

In the present invention, carbon gases, particularly oxides of carbon, are converted to easily sequestered carbon by reaction with metals, alloys, and associated reactions to complete a cyclic process. Preferably the metal is magnesium. However, other metals and alloys may be used, most notably, beryllium, boron, aluminum, silicon, calcium, titanium, zirconium, and hydrides thereof.

In one aspect of the invention, there is a method of sequestering one or more oxides of carbon comprising the steps of: (a) providing a stream comprising oxides of carbon from a source to a process apparatus; (b) delivering a metal fuel to the process apparatus; (c) combusting said metal fuel with said one or more oxides of carbon to form a metal oxide and a carbonaceous material; (d) regenerating said metal fuel from said metal oxide; and, (e) recycling at least a portion of said the metal fuel to said process apparatus.

In some embodiments, the metal fuel comprises magnesium and said step of combusting forms magnesium oxide.

In some embodiments, the step of regenerating comprises reacting said metal oxide with an ammonium halide to form a metal halide. In some embodiments, the step of regenerating is coupled to a Solvay-type process. In some embodiments, the step of regenerating further comprises converting metal halide to metal using an electrolysis reaction. In some embodiments using a Solvay-type process, one or more oxides of carbon are sequestered in the Solvay process to sodium bicarbonate. In some embodiments, the one or more oxides of carbon comprises carbon dioxide. In some embodiments, the one or more oxides of carbon comprises carbon monoxide. In some embodiments, the method further comprises the step of generating power using the energy released in said step of combusting. In some embodiments, the metal fuel comprises a component selected from the group consisting of lithium, beryllium, aluminum, silicon, calcium, titanium, zirconium, and any combination thereof. In some embodiments, the method further comprises the step of transmitting heat generated from the combustion of carbon oxides with metal fuels to the process of regenerating metal fuel from metal oxide decomposition products. In some embodiments, the method further comprises using the heat to drive at least one additional chemical process. In some embodiments, the further comprises using the heat of combustion in at least the electrolysis process to regenerate the metal halide to metal fuel. In some embodiments, the method further comprises using the heat of combustion in at least the Solvay process to convert the metal oxide into a metal halide.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

As used herein, "a" or "an" means one or more. Unless otherwise indicated, the singular contains the plural and the plural contains the singular.

As used herein, the term "sequestering", when used in reference to oxides of carbon refers to a process of converting the oxides of carbon to a form that is less likely to migrate into the atmosphere.

Oxides of carbon, from a source, such as a subterranean reservoir producing $CO_2$ with other commercial subterranean fluids, a power generation plant, or process facility converting methane into ammonia is reacted with a metal fuel, preferably magnesium to produce heat, metal oxides (shown below as magnesium oxide) and carbon. Although the example reactions below are shown with magnesium metal, it should be understood that in the general case, other metals may be used. Possible alternative metals are discussed below. The reactions are schematically shown below:

$$CO_2 + Mg \rightarrow MgO + CO$$

$$Mg + CO \rightarrow MgO + C$$

The overall reaction being:

$$CO_2 + 2Mg \rightarrow 2MgO + C \qquad (1)$$

Figure 1:
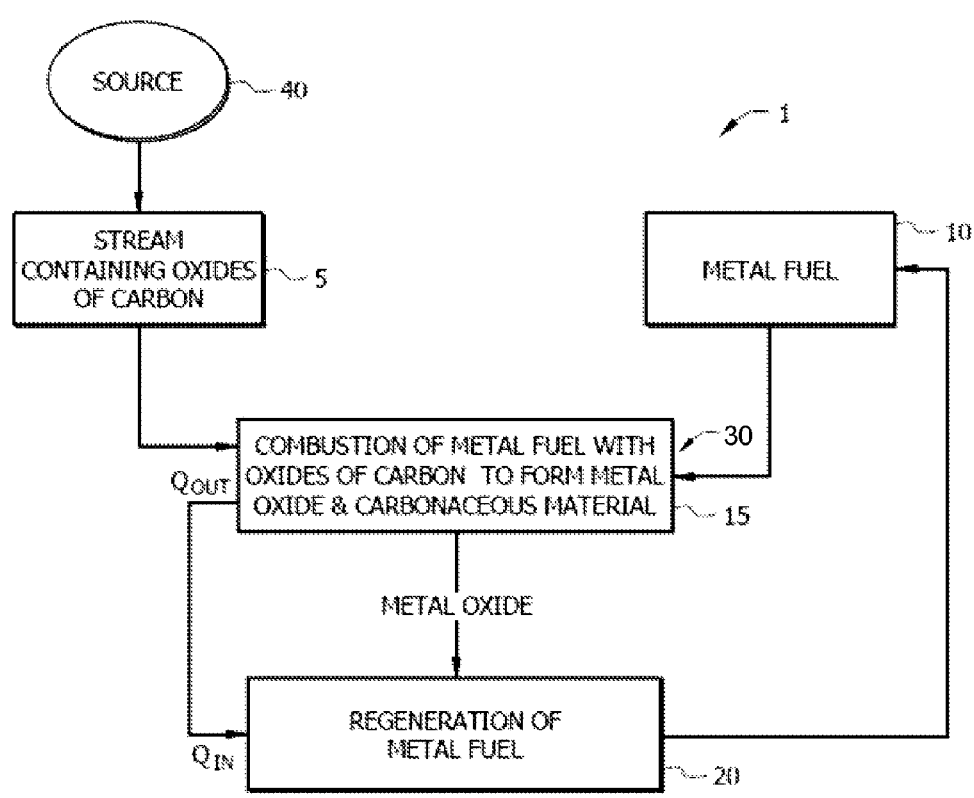
FIG. 1 schematically illustrates the combustion of metal fuel to sequester $CO_2$, along with the recycling of metal fuel.

Note that most of the discussion and examples will focus on $CO_2$, but it should be understood that the invention encompasses other oxides of carbon. In the mechanism shown above, the carbon dioxide may be sequestered from a stream containing it. The sequestration may further comprise other methods, such as placing the resulting carbonaceous material in a subterranean reservoir or using the resulting carbonaceous material in a useful chemical process. The above-described process is shown schematically in FIG. 1 The overall process, 1, of FIG. 1 is a semi-cyclic process using a stream, 5, of one or more oxides of carbon, such as $CO_2$, from a source, 40. Sequestration of the $CO_2$ into stable non-gaseous states at ambient earth conditions results from a step of combustion, 15, of a metal fuel with $CO_2$ from the stream 5. The metal fuel, 10, is shown in FIG. 1 as being transported into the overall process 1 from a source 10 or from the regeneration loop 20 or both. The metal fuel 10 can be prepared for use in the combustion reaction by any of the well known methods to those familiar with the art including, heating, pulverize, and or atomize the metal fuel prior to entering the combustion process 15. Metal oxide formed from the combustion, 15, is then put through a regeneration process, 20, which forms metal fuel, which is recycled back into the process at step 10. The combustion, 15, of the metal fuel with $CO_2$ is quite exothermic and the heat of this process is shown as $Q_{out}$ in FIG. 1 This heat can be used to drive the regeneration of metal fuel, 20. If the metal fuel is re-generated by electrolysis, the heat can be used to generate the electricity to do so.

The use of carbon oxides, like $CO_2$ as an oxidizing agent may appear counterintuitive, but there are certain fuels that can remove the bound oxygen with a substantial release of energy. The most promising candidates are metals and their hydrides and mixtures with hydrogen compounds. The equilibrium thermodynamic performance of a wider range of these candidates including lithium (Li), beryllium (Be), boron (B), magnesium (Mg), aluminum (Al), silicon (Si), calcium (Ca), titanium (Ti), zirconium (Z), beryllium hydride ($BeH_2$), magnesium hydride ($MgH_2$), diborane ($B_2H_6$), and silane ($SiH_4$) should be favorable.

The reaction scheme provided above for magnesium is modified in the case of metals other than mono-valent metals. The overall reaction is quite exothermic, the resulting energy released can used recovered for use in other industrial process, in power generation, or to supply energy to support the overall process.

An important aspect of the present invention is the regeneration of the metal fuel from the metal oxide that is formed in reaction (1) of FIG. 1. In this way, a reaction loop is formed such that $CO_2$ can be continuously removed from an incoming stream 5 from a source 40 outside the overall process 1. containing it. This regeneration of metal fuel 20 can be done in any way, including methods currently known in the art as well as those to be developed in the future. In one aspect of the present invention, the metal oxide (e.g., MgO) produced by reaction (1) is used in a regeneration process 20 which includes electrolysis and a Solvay-type process to form a metal salt:

$$2NH_4Cl + MgO \rightarrow 2NH_3 + MgCl_2 + H_2O \qquad (2)$$

Figure 3:
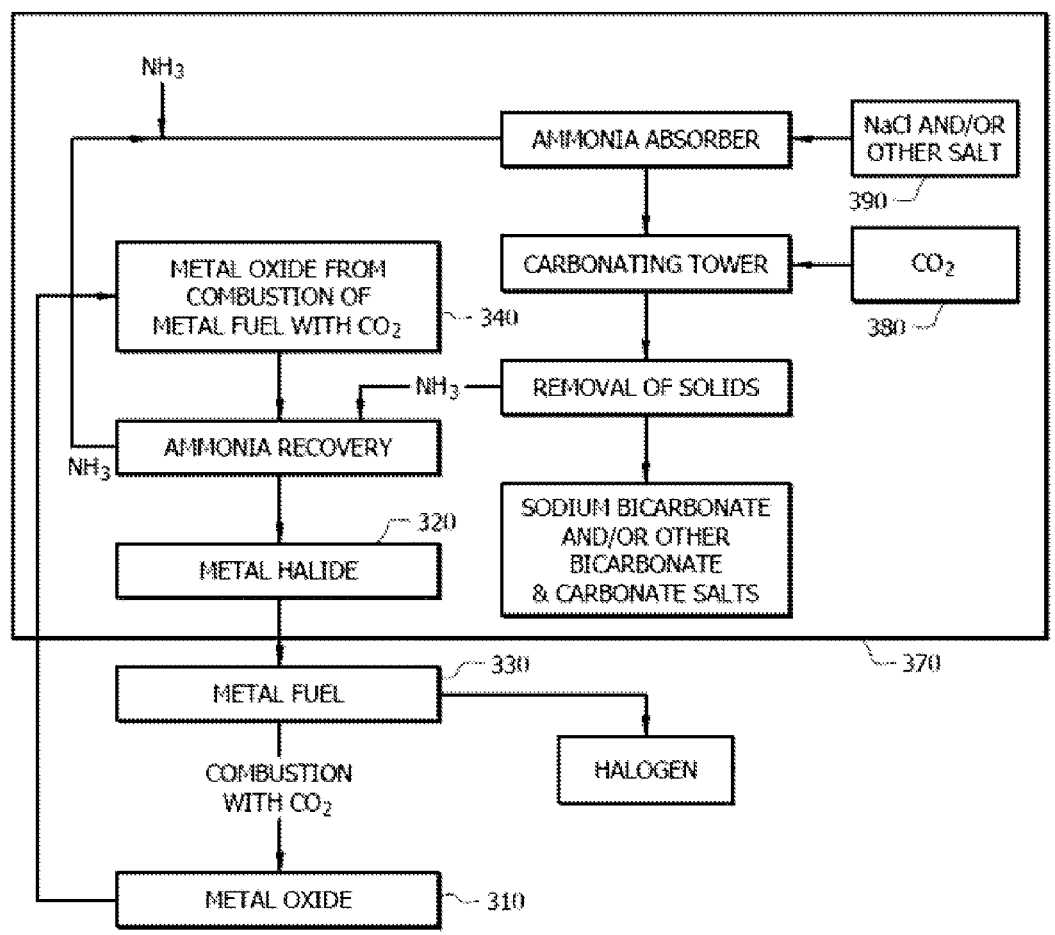
FIG. 3 schematically illustrates the incorporation of the combustion process using oxides of carbon into a Solvay-type reaction.

Again, it should be understood that although MgO is shown, any suitable metal oxide can be used, such that the general combustion process shown above may utilize other metals. Also, although ammonium chloride is used and magnesium chloride is formed, it should be understood that other ammonium salts (or even salts with a counter ion other than ammonium) may be used. The classic Solvay process uses a reaction that is similar to reaction (2) above except that it uses calcium oxide (CaO) in place of MgO and forms calcium chloride ($CaCl_2$) instead of magnesium chloride ($MgCl_2$). Indeed the Solvay process can be a significant chemical process to sequester carbon gases, however the metal oxides used in the process to regenerate the ammonia catalyst are not generated by the burning of the metal with a carbon oxides. Traditionally, Solvay process use calcium oxide to regenerate ammonia, and said calcium oxide is generated from burning limestone. The Solvay process itself and modifications of it are well known. Its use in this embodiment of the present invention for the regeneration of metal fuel 330 is accomplished by consuming metal oxide 340 and producing metal halide 320. Incorporation of the Solvay-type process has the added benefit of sequestering additional carbon dioxide 380 by conversion to sodium bicarbonate and/or other bicarbonate and carbonate salts as shown in FIG. 3. The inputs are sodium chloride and or other salts 390. Metal fuel 330 is regenerated from metal halide 320, preferably by electrolysis, with a halogen, typically chlorine gas as a by-product. 330 producing commercial products of chlorine (a halogen) and carbon. Upon combustion with $CO_2$, the metal fuel is converted to metal oxide 310, which is recycled into the Solvay-type process at 340.

The final step in the process involves the conversion of the metal ion back to the metal fuel which is then recycled and used in the combustion process to sequester additional $CO_2$. In the preferred embodiment, this step is done by the known method of electrolysis. In the case of magnesium chloride, this is illustrated by reaction (2):

$$Mg^{+2} + 2e^- \rightarrow Mg$$

$$2Cl^- \rightarrow Cl_2 + 2e^-$$

The overall reaction being:

$$Mg^{+2} + 2Cl^- \rightarrow Cl_2 + Mg \quad (3)$$

Although the examples shown the regeneration of Mg salt (ions), it should be understood that other metal salts (ions) can be used. The metal is then recycled back to step 1 to convert additional $CO_2$ to carbon. This final step is shown in FIG. 1. The process has the added benefit of release of energy at step 15 as a result of the reaction of $CO_2$ as an oxidizing agent in the presence of a metal which can be used in step 20. The approach involves burning $CO_2$ at step 15 directly as an oxidizer with some suitably energetic fuel, in the preferred embodiment magnesium metal. The major requirement is an abundant source of $CO_2$, and salt water as one would find in power generation plants using fossil fuels like coal, natural gas, and oil which are also near the sea or brine wells, at certain oil and gas fields where large amounts of $CO_2$ is produced from subterranean reservoirs with salt waters and commercial fluids like methane, and at ammonia plants where in ammonia is produced from methane, and perhaps in energy-intensity manufacturing facilities.

Figure 2:
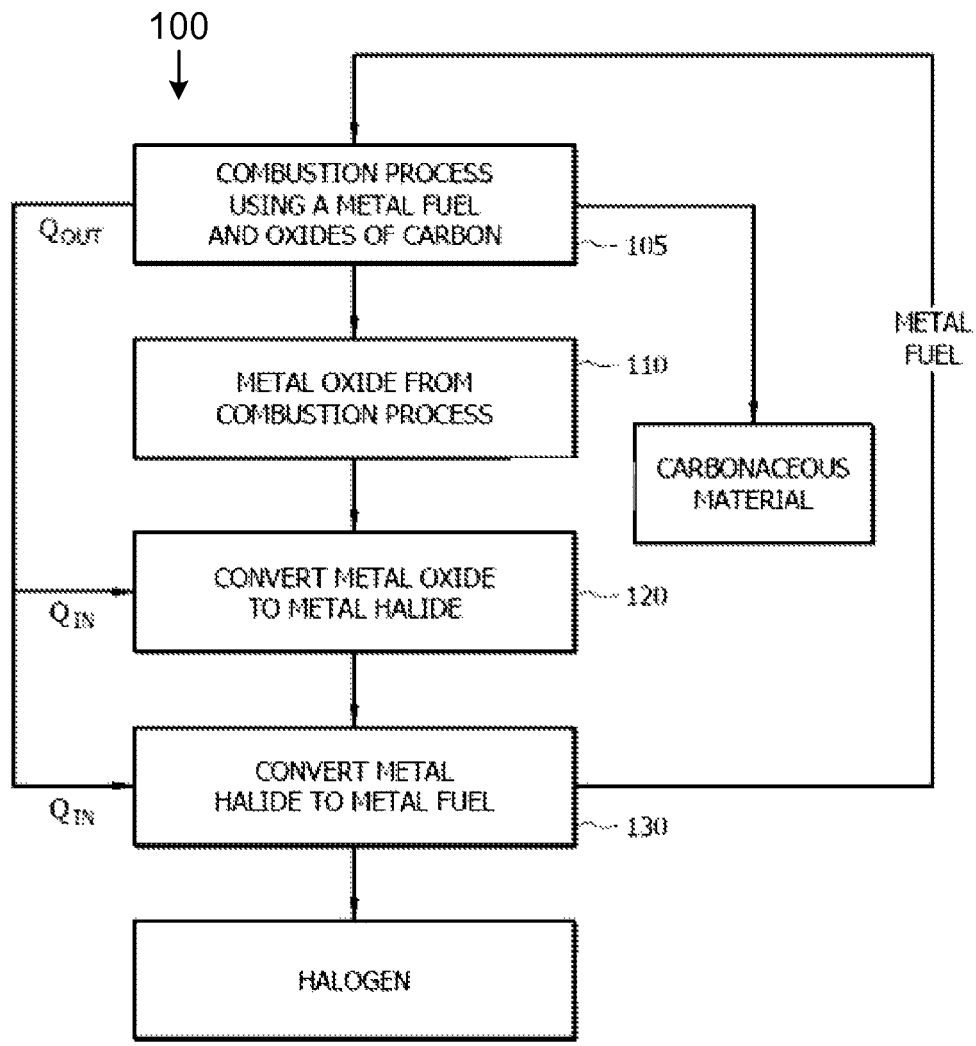
FIG. 2 schematically illustrates one embodiment showing the steps involved in the recycling of metal fuel.

FIG. 2 schematically illustrates this inventions preferred embodiment of a regeneration of metal fuel in a process, 100, coupled to combustion with a metal fuel, 105. The metal oxide which results from the combustion process, 110, is converted to metal halide by any suitable process, 120. This invention includes using the method of using a modified Solvay loop shown in FIG. 3 as 370. Thus, 120 in FIG. 2 can, in a preferred embodiment, be process 370 of FIG. 3. Again referring to FIG. 2, the metal halide is converted to metal fuel at 130. This conversion is preferably accomplished using an electrolysis process. Some or all of the heat, $Q_{out}$, produced by the combustion of metal fuel and $CO_2$ can be used as heat, $Q_{in}$, to drive the conversion of metal halide to metal fuel. The resulting metal halide from process point 320 is then converted, 330, to metal fuel, to be recycled back to the combustion process, 340. It is clear to those familiar with the art of combustion that the fuel, which is a metal in this case, and the oxidizer, which is a carbon gas in this case, can be run at different fuel to oxidizer rations. The running of this process at fuel rich ratios reduces the amount of carbon gases released from the combustion, whereas running the combustion process fuel lean results in less fuel being required, higher adiabatic temperatures of combustion, and increased carbon oxides not consumed in the combustion.

The metal can be initially sourced 10 of FIG. 1 in any way and added to the process shown in FIG. 1 at 30. In the case of magnesium, the well-known Pidgeon process is one example of how one can obtain the magnesium feedstock but electrolysis from sea water and well brine water are also a well known means to those familiar with the art of electrolysis.

Another method to obtain the initial magnesium and indeed additional magnesium metal for process point 30 of FIG. 1 is The Pidgeon process is one of the methods of magnesium metal production, via a silicothermic reduction.

The basic chemical equations of this process are:

$$Si(s) + MgO(s) \leftrightarrow SiO2(s) + Mg(g) \text{(high temperature, distillation boiling zone)}$$

$$Mg(g) \leftrightarrow Mg(liq,s) \text{(low temperature, distillation condensing zone)}$$

Silicon and magnesia react to produce silica and magnesium.

The reaction is thermodynamically unfavorable, however, in accordance with the Le Chatelier's principle of equilibriums, it can still be driven to the right by continuous supply of heat, and by removing one of the products, namely distilling out the magnesium vapor. The atmospheric pressure boiling point of magnesium metal is very low, only 1090° C., and even lower in vacuum. Vacuum is preferred, because it allows lower temperatures.

The most commonly used and cheapest form of silicon is as a ferrosilicon alloy. The iron from the alloy is but a spectator in the reactions.

The magnesium raw material of this reaction, can be obtained by several means. The raw materials generally have to be calcined to remove both water and carbon dioxide, which would be gaseous at reaction temperatures, and follow the magnesium vapor around, and revert the reaction.

One way is by sea or lakewater magnesium chloride hydrolyzed to hydroxide, which is then calcined to magnesium oxide by removal of water. Another way is using mined magnesite ($MgCO_3$) that has been calcined to magnesium oxide by carbon dioxide removal. By far the most used raw material is mined dolomite, a mixed $(Ca,Mg)CO_3$, where the calcium oxide present in the reaction zone scavenges the silica formed, releasing heat and consuming one of the products, thus helping push the equilibrium to the right.

$$(Ca,Mg)CO_3(s) \rightarrow CaO \cdot MgO(s) + CO_2(g) \text{(dolomite calcining)}$$

$$(Fe,Si)(s) + MgO(s) \leftrightarrow Fe(s) + SiO_2(s) + Mg(g)$$

$$CaO + SiO_2 \rightarrow CaSiO_3$$

The Pidgeon process is a batch process in which finely powdered calcined dolomite and ferrosilicon are mixed, briquetted, and charged in retorts made of nickel-chrome-steel alloy. The hot reaction zone portion of the retort is either gasfired, coalfired, or electrically heated in a furnace, while the condensing section equipped with removable baffles extends from the furnace and is water-cooled. Due to distillation, very high purity magnesium crowns are produced, which are then re-melted and cast into ingots.

In the preferred embodiment of the present invention, a metal fuel is obtained from metal chloride solutions from well brine waters, and or sea water which are heated, dehydrated, and placed in an electrolysis cell wherein the metal is separated and collected while chlorine gas is produced as a by-product of the cell. Therefore, the preferred embodiment includes a conversion of carbon dioxide to carbon and metal oxide using magnesium metal obtained from electrolysis. The preferred embodiment uses a modified Solvay process at the inventions process point 120 shown in FIG. 2 to convert a combustion product of carbon dioxide, that is magnesium oxide, into magnesium chloride, and then electrolysis at process 130 node to convert the magnesium chloride back into to magnesium which in turn said magnesium is reintroduced to the combustion node at 105 to decompose carbon dioxide into magnesium oxide and carbon at 110 in FIG. 2. The preferred embodiment of the invention teaches the use of a modified Solvay process shown in FIG. 3 process node 370 wherein magnesium oxide is substituted at 340 for calcium oxide in the classic Solvay process. The addition of the Solvay loop, 370 further allows oxides of carbon like $CO_2$ from a source 380, to be continually sequestered in solid form of sodium bicarbonate 360 while assisting this inventions regenerative metal recovery loop shown in FIG. 2 at process point 130 of metal oxide, to metal chloride, to metal for the fuel to combust the carbon oxides.

In the classic Solvay process, soda ash is the product (predominantly sodium carbonate ($Na_2CO_3$)) from brine (as a source of sodium chloride (NaCl)) and from $CO_2$. However, in the preferred embodiment of the present invention the process is not driven to produce sodium carbonate, but sodium bicarbonate in order to sequester the $CO_2$. The classic process then uses the $CO_2$ and the resulting calcium oxide to make useful products such as soda ash. The current invention teaches the use of a metal regeneration loop wherein a portion of the metal regeneration loop is used to recover the lixiviant ammonia in a Solvay process, where in the Solvay process is also used to sequester carbon dioxide and the metal oxide used to regenerate the Solvay ammonia is obtained from this inventions electrolysis loop or an outside source.

The industrial purpose of this invention is then to produce carbon, sodium bicarbonate, chlorine gas, and sequester or convert carbon oxides into solids thereby allowing the invention to generate carbon credits from the $CO_2$ it burns and sequesters.

The actual implementation of this global, overall Solvay reaction is intricate. A simplified description can be given using the four different, interacting chemical reactions illustrated in the figure. In the first step in the process, carbon dioxide ($CO_2$) passes through a concentrated aqueous solution of sodium chloride (NaCl) and ammonia ($NH_3$).

$$NaCl + CO_2 + NH_3 + H_2O \rightarrow NaHCO_3 + NH_4Cl \qquad (I)$$

In industrial practice, the reaction is carried out by passing concentrated brine through two towers. In the first, ammonia bubbles up through the brine and is absorbed by it. In the second, carbon dioxide bubbles up through the ammoniated brine, and sodium bicarbonate ($NaHCO_3$) precipitates out of the solution. Note that, in a basic solution, $NaHCO_3$ is less water-soluble than sodium chloride. The ammonia ($NH_3$) buffers the solution at a basic pH; without the ammonia, a hydrochloric acid byproduct would render the solution acidic, and arrest the precipitation.

The necessary ammonia "catalyst" or lixiviant for reaction (I) is reclaimed in a later step, and relatively little ammonia is consumed. The carbon dioxide required for reaction (I) is traditionally produced by heating ("calcination") of the limestone at 950-1100° C. However, in the current invention the $CO_2$ will be obtained from industrial processes wherein $CO_2$ is generated. Examples of these industrial processes are ammonia generation plants converting methane into ammonia, or in other large hydrocarbon or coal burning power plants. The traditional Solvay process uses calcium carbonate ($CaCO_3$) in the limestone is partially converted to quicklime (calcium oxide (CaO)) and carbon dioxide:

$$CaCO_3 \rightarrow CO_2 + CaO \qquad (II)$$

The sodium bicarbonate ($NaHCO_3$) that precipitates out in reaction (I) is filtered out from the hot ammonium chloride ($NH_4Cl$) solution, and the solution is then reacted with the quicklime (calcium oxide (CaO)) left over from heating the limestone in step (II).

$$2NH_4Cl + CaO \rightarrow 2NH_3 + CaCl_2 + H_2O \qquad (III)$$

CaO makes a strong basic solution. The ammonia from reaction (III) is recycled back to the initial brine solution of reaction (I).

The sodium bicarbonate ($NaHCO_3$) precipitate from reaction (I) is then converted to the final product, sodium carbonate ($Na_2CO_3$), by calcination (160-230° C.), producing water and carbon dioxide as byproducts. The $CO_2$ produced can be can be recycled into the process into the carbonating tower, or it can be treated by combustion with metal fuel.

$$2NaHCO_3 \rightarrow Na_2CO_3 + H_2O + CO_2 \qquad (IV)$$

The carbon dioxide from step (IV) is traditionally recovered for re-use in step (I). However, in the preferred embodiment the sodium bicarbonate will be the final product of the Solvay loop to take advantage of the now sequestered $CO_2$. The present invention teaches the use of carbon oxides from outside sources to the Solvay loop, as one of the industrial purposes is to sequester $CO_2$ for carbon credits. When properly designed and operated, a Solvay plant can reclaim almost all its ammonia, and consumes only small amounts of additional ammonia to make up for losses. The only major inputs to the modified Solvay process are salt water, metal oxide, $CO_2$, and thermal energy, and its only major byproduct is sodium bicarbonate carbonate and metal chloride.

In preferred embodiments, other metal oxides, such as magnesium oxide (MgO), are substituted for CaO in reaction (III). However, calcium may be used in the combustion of carbon oxides in this process and calcium may be obtained from an outside source as well in this invention. Therefore, standard form of the classic Solvay process may be used. In the preferred embodiment, reaction (2) below is used in place of reaction (III) above:

$$2NH_4Cl + MgO \rightarrow 2NH_3 + MgCl_2 + H_2O \qquad (2)$$

As shown above, the $MgCl_2$, after dissociation into its component ions, is converted to magnesium metal (Mg) by electrolysis as shown in step 3 above. This magnesium is recycled back into step 1 for the combustion reaction which consumes and therefore sequesters additional $CO_2$. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of sequestering one or more oxides of carbon comprising the steps of:
   (a) providing a stream comprising oxides of carbon from a source and a salt water source to a process apparatus;
   (b) delivering a metal fuel to the process apparatus;
   (c) combusting said metal fuel with said one or more oxides of carbon to form a metal oxide and a carbonaceous material;
   (d) regenerating said metal fuel from said metal oxide using a halide obtained from the salt water source;
   (e) recycling at least a portion of said the metal fuel to said process apparatus; and (f) sequestering the one or more oxides of carbon to form sodium bicarbonate.

2. The method of claim 1, wherein said metal fuel comprises magnesium and said step of combusting forms magnesium oxide.

3. The method of claim 1, wherein said step of regenerating comprises reacting said metal oxide with an ammonium halide to form a metal halide.

4. The method of claim 3, wherein said step of regenerating further comprises converting said metal halide to metal using an electrolysis reaction.

5. The method of claim 1, wherein said one or more oxides of carbon comprises carbon dioxide.

6. The method of claim 1, wherein said one or more oxides of carbon comprises carbon monoxide.

7. The method of claim 1, further comprising the step of generating power using the energy released in said step of combusting.

8. The method of claim 1, wherein said metal fuel comprises a component selected from the group consisting of lithium, beryllium, aluminum, silicon, calcium, titanium, zirconium, and any combination thereof.

9. The method of claim 1, further comprising the step of transmitting heat generated from the combustion of carbon oxides with metal fuels to the process of regenerating metal fuel from metal oxide.

10. The method of claim 9, further comprising using the heat to drive at least one additional chemical process.

11. The method of claim 9, further comprising using the heat of combustion in at least an electrolysis process to regenerate a metal halide to metal fuel.

12. The method of claim 9, further comprising using the heat of combustion to convert the metal oxide into a metal halide.

* * * * *